Figure 1:
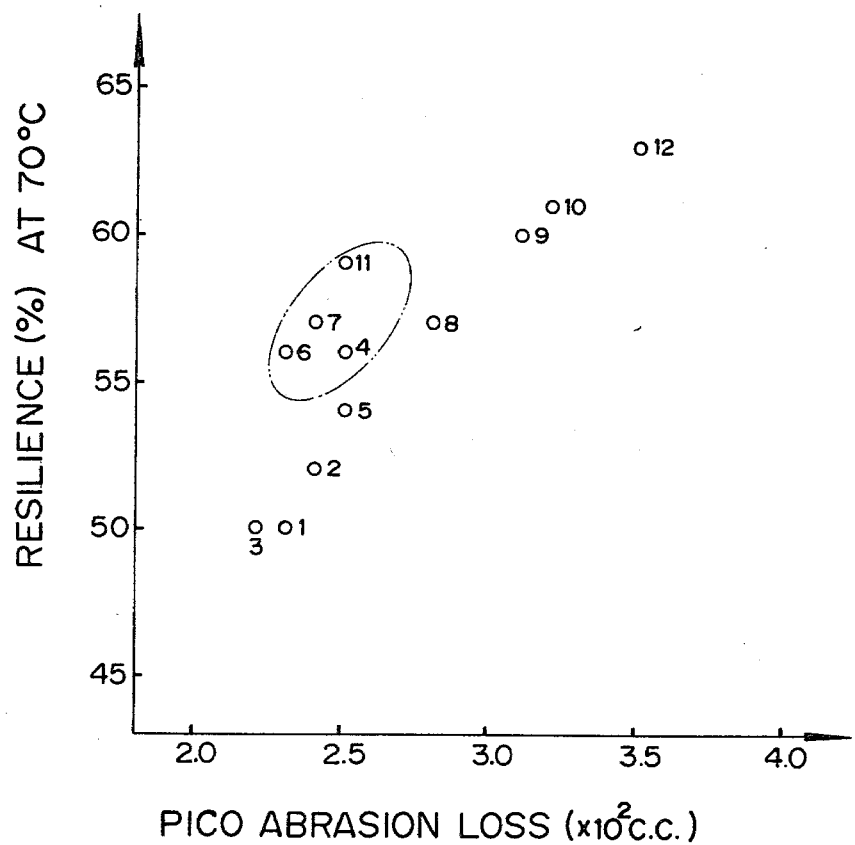

United States Patent [19]

Ahagon et al.

[11] 4,309,318

[45] Jan. 5, 1982

[54] TREAD COMPOSITIONS FOR TIRES HAVING LOW ROLLING RESISTANCE

[75] Inventors: Asahiro Ahagon; Makoto Misawa, both of Hiratsuka; Hiroshi Hirakawa, Isehara; Kazuo Miyasaka, Hiratsuka, all of Japan

[73] Assignee: Yokohama Rubber Co., Ltd., Tokyo, Japan

[21] Appl. No.: 95,047

[22] Filed: Nov. 16, 1979

[30] Foreign Application Priority Data

Dec. 28, 1978 [JP] Japan ................................. 53-161158

[51] Int. Cl.$^3$ ..................... C08L 7/00; C08L 47/00; C08K 3/04
[52] U.S. Cl. .................... 260/5; 260/42.32; 260/42.47; 525/192; 525/232; 525/349; 525/354; 525/237; 525/343
[58] Field of Search ................ 260/5, 42.32, 42.47; 525/349, 354, 192, 232, 237, 343

[56] References Cited

U.S. PATENT DOCUMENTS

| | | | |
|---|---|---|---|
| 3,411,970 | 11/1968 | Perrin | 260/5 |
| 3,915,943 | 10/1975 | Wright | 525/349 |
| 4,012,344 | 3/1977 | Cohen | 260/5 |
| 4,193,437 | 3/1980 | Powell | 260/42.32 |

OTHER PUBLICATIONS

Alliger et al., "Vulcanization of Elastomers" Reinhold Publishing Corp., New York, 1964, pp. 98–99.

*Primary Examiner*—Allan Lieberman
*Attorney, Agent, or Firm*—Jordan and Hamburg

[57] ABSTRACT

A tread composition for low rolling resistance tires, comprising 100 parts by weight of styrene-butadiene rubber or a styrene-butadiene rubber-based rubber blend and 3.2–5.0 parts by weight of sulphur.

5 Claims, 1 Drawing Figure

TREAD COMPOSITIONS FOR TIRES HAVING LOW ROLLING RESISTANCE

This invention relates to a tread composition for tires having low rolling resistance and more particularly to a tread composition for tires having low rolling resistance and being capable of minimizing a decrease of the tires in wet road braking performance and wear resistance, the tread composition being prepared by incorporating styrene-butadiene rubber (hereinafter referred to as "SBR") or a SBR-based blend with sulphur in a more amount than conventional.

Rubber compositions which will produce tires having a small hysteresis loss due to deformation thereof when they are rolled, have tentatively been used in attempts to obtain tires having decreased rolling resistance.

Since the tread portion of a tire occupies a considerable part thereof, it is very advantageous in obtaining a tire having low rolling resistance to use a tread composition which will produce a tread having low hysteresis loss. Conventional tread compositions are composed of materials, which will tend to increase hysteresis loss in the resulting treads, to meet various requirements for treads; however, it is advantageous to decrease the hysteresis loss of the tread portion of the resulting tire rather than to decrease that of the other portion thereof in order to lower efficiently the rolling resistance of the resulting tire.

If it is attempted to produce a tread having decreased hysteresis loss, then the resulting tread will tend to decrease in wet road braking performance and wear resistance as far as the tread is produced by the use of conventional techniques or methods. Thus, new techniques or methods have been sought or required to reduce the hysteresis loss of the treads of tires thereby to obtain the tires giving low rolling resistance without impairing braking performance on wet road surfaces, wear resistance and other properties.

The present invention was made to meet the aforesaid requirements.

A primary object of this invention is to provide a tread composition which will produce tire treads (for passenger car radial tires for example) having decreased rolling resistance without impairment of wet road braking performance and wear resistance. The tread composition may be used as such for low rolling resistance tires.

The present inventors were interested in tread compositions which were the most conducive to lowering the rolling resistance of the resulting tires, and they made intensive studies in an attempt to obtain tire treads having reduced hysteresis loss as the main objective as well as wet road braking performance and wear resistance with the result that they succeeded in making the present invention directed to tread compositions for producing such attempted tire treads.

The tread compositions of the present invention comprise, by weight, (A) 100 parts of a member selected from the group consisting of SBR alone and a SBR-based blend containing at least 50% of SBR and less than 50% of at least one member selected from the group consisting of natural rubber and synthetic diene rubbers and (B) 3.2–5.0 parts of sulphur.

The SBR used for the tread compositions of the present invention includes SBR obtained by solution polymerization or emulsion polymerization and preferably having a styrene content of 15–28 wt.%. In addition, it is necessary that the SBR-based rubber blends used in the present invention contain at least 50%, preferably at least 70%, by weight of the SBR.

The kind or nature of the rubber or rubber blends, the amount of sulphur, and the kind and amount of carbon black used in the tread compositions of the present invention as well as the functions of these ingredients, will be explained hereinbelow.

Wet road braking performance is an important property required in tires. In laboratories, tread compositions may be evaluated by measuring them for wet skid resistance values on a wet test surface by the use of British portable skid tester in accordance with ASTM E 303-74. The wet road braking performance of a tire is greatly influenced depending mainly on the kind of rubber or rubbers used in the preparation of the tire tread portion. Of general purpose rubbers, SBR is suitable for the tread material which will provide tire treads having improved wet road braking performance and may preferably be used in an amount of at least 50 wt.%, preferably at least 70 wt.% of the whole rubber material.

The SBR-based rubber material contains natural rubber and/or synthetic diene rubber in addition to SBR.

The synthetic diene rubbers used herein may preferably be 1,4-polyisoprene rubber containing at least 90% of cis-1,4-bond units or 1,4-polybutadiene rubber containing up to 20% of 1,2-bond units. The addition of 1,4-polybutadiene rubber to SBR will increase wear resistance but decrease wet road braking performance. The rubber material (100 parts by weight) used herein may include up to 20 parts, preferably up to 15 parts, by weight of 1,4-polyisoprene rubber.

The addition of natural rubber or 1,4-polyisoprene rubber to SBR will tend to lower the rolling resistance but decrease wet road braking performance. The rubber material (100 parts by weight) used herein may include less than 50 parts, preferably 30 parts, by weight of natural rubber or 1,4-polyisoprene rubber.

In the preparation of the tread composition of the present invention, at least 40 parts by weight of carbon black may be used per 100 parts by weight of the rubber material. The amount of less than 40 parts of carbon black will be ineffective to maintain the wet road braking performance and wear resistance of tire treads at the required level for actual use.

There may preferably be used carbon black having an oil absorbability (DBP absorption number according to ASTM-D-2411) of at least 119 cc/100 g. The use of carbon black in an increased amount will be effective in enhancing wet skid resistance values. These values will hardly be varied depending on the kind of carbon black, the amount of sulphur, and other additives used.

The rolling resistance performance of a tire tread is associated directly with the hysteresis loss thereof. As the hysteresis loss of cured rubber (that is a tire) at an elevated temperature around 70° C. at which the tire tread usually reaches its running state, is smaller, the rolling resistance of the tire in the running state is lower. In the laboratories, therefore, it is possible to evaluate hysteresis loss of treads in a running condition by measuring the resilience (or rebound) of cured rubber heated to 70° C. The smaller the resilience value is, the higher the hysteresis loss is. As the amount of sulphur used is increased, the resilience value obtained is increased and the rolling resistance decreased. This effect is remarkable with the case where SBR is mainly used as the rubber material. Further, as the amount of sulphur used is increased, the wear resistance is increased. In the preparation of tread compositions of the present invention, 3.2–5.0 parts, preferably 3.2–4.5 parts, by weight of sulphur may be used per 100 parts by weight of the rubber material. The use of less than 3.2 parts by weight of sulphur will be ineffective in lowering the rolling resistance to the satisfactory level. The use of more than 5.0 parts by weight of sulphur will result in increasing the resilience value of the resulting cured rubber to some extent while it will increase the modulus thereof to an unduly high extent whereby the cured rubber (that is the tread of a tire) in a running state tends to raise a crack growth problem, this being disadvantageous.

In the preparation of tire treads, 1.0–2.5 parts by weight of sulphur (per 100 parts by weight of rubber material) have heretofore been used although up to 3.0 parts by weight of sulphur have exceptionally been used in some cases. Usually, 1.5–2.0 parts by weight of sulphur have hitherto been added particularly to a SBR-based rubber material. Since the use of sulphur in an amount of as much as 3.2–5.0 parts by weight as in the present invention is likely to cause scorching due to premature cure during processing, such a large amount of sulphur has heretofore not been used. However, it is possible to subject even a rubber composition of the present invention to processing on an industrial scale by using carefully the recent remarkably advanced techniques of processing or using $\beta$-sulphur (generally referred to as "insoluble sulphur") as the curing agent.

The sulphur used in the present invention includes sulphur in $\alpha$-crystal form which has heretofore been generally used in the rubber industry, or sulphur in $\beta$-crystal form which may be used without causing premature cure and blooming.

The higher the DBP absorption number of carbon black used in a rubber composition is, the higher the wear resistance of the resulting rubber product is, even if the resulting rubber products are at the equivalent resilience level. Further, the higher iodine adsorption number of a carbon black used has, the lower resilience value the resulting rubber product exhibits with improved wear resistance. As the amount of carbon black used in a rubber composition is increased, the resulting rubber product exhibits improved wear resistance but exhibits decreased resilience and increased hysteresis loss. The use of carbon black having high iodine adsorption number in a rubber composition will have the same effects on the hysteresis loss and wear resistance of the resulting rubber product as the use of carbon black having less high iodine adsorption number in a more amount. It is advantageous, however, to use carbon black having 60–100 [$gI_2/Kg$] in an increased amount in order to maintain the water resistance at a fixed level and keep the hysteresis loss to as low a level as possible in the resulting rubber product. The use of carbon black in an increased amount will improve the resulting rubber product also in wet road braking performance.

As a more amount of carbon black or sulphur is contained in a tire tread composition, the resulting tire tread will exhibit higher hardness; however, since the resulting tire tread having a JIS (Japanese Industrial Standard) hardness of 75 or higher is apt to cause faster crack growth due to a cut suffering at the outer surface of the tire tread in a running state, it is desirable that the hardness be in the range of less than a JIS hardness of 75.

The tire tread compositions of the present invention may be incorporated further with carbon black and a vulcanization accelerator as well as, if desired, a conventional filler, softening agent, process oil and the like.

The tire tread compositions of the present invention may also be incorporated with a sulphur-containing curing agent in combination with sulphur.

This invention will be better understood by the following Examples and Comparative examples wherein all the parts and percentages are by weight unless otherwise specified.

EXAMPLES 1–8 AND COMPARATIVE EXAMPLES 1–7

In the Examples, there was prepared a rubber composition using 100 parts of the rubber material, 55 parts of the carbon black (N339: Designation in accordance with ASTM 2516) and the other additives as shown in Table 1. The preparation was effected in the following manner.

Mixing of the aforesaid ingredients was effected on a B-type Banbury mixer which was initially operated at the mixer wall temperature of 60° C. and a rotor rotation of 40 rpm and adjusted to keep the resulting mixture in the jacket of the mixer at 110°–120° C. The rubber material was introduced into the mixer and mixed for 30 seconds, after which the carbon black and ingredients other than the sulphur and the vulcanization accelerator were introduced into the mixer where the whole was mixed together for 4.5 minutes. The mixture so obtained was mixed further with the sulphur and vulcanization accelerator for 4 minutes on a 8-inch roll mill at an adjusted temperature of 60° C. to form a blend which was then formed to an about 3 mm thick sheet. Samples prepared from the thus formed sheet were cured at 160° C. for 20 minutes and then tested for properties in accordance with JIS K-6302 with the results being shown in Table 1. It is seen from Table 1 that the rubber compositions of the present invention provided the rubber products having improved resilience without impairing wet skid resistance and wear resistance.

TABLE 1

| Rubber composition and Properties of cured product | Comparative example 1 | Comparative example 2 | Example 1 | Example 2 | Example 3 | Example 4 | Example 5 |
|---|---|---|---|---|---|---|---|
| SBR (*1) | 100 | 100 | 100 | 100 | 100 | 100 | 70 |
| BR (*2) | — | — | — | — | — | — | — |
| Natural rubber (RSS No. 1) | — | — | — | — | — | — | 30 |
| Zinc oxide | 4 | 4 | 4 | 4 | 4 | 4 | 4 |
| Stearic acid | 2 | 2 | 2 | 2 | 2 | 2 | 2 |
| Antioxidant | 3 | 3 | 3 | 3 | 3 | 3 | 3 |
| Carbon black (N339) (*6) | 55 | 55 | 55 | 55 | 55 | 55 | 55 |
| Aromatic oil | 20 | 20 | 20 | 20 | 20 | 20 | 20 |

TABLE 1-continued

|  | | | | | | | |
|---|---|---|---|---|---|---|---|
| Vulcanization accelerator (NOBS) (*3) | 1.2 | 1.2 | 1.2 | 1.2 | 1.2 | 1.2 | 1.2 |
| Sulphur | 2.0 | 3.0 | 3.2 | 3.5 | 4.0 | 5.0 | 3.2 |
| Properties of cured products | | | | | | | |
| 100% modulus (Kg/cm$^2$) | 25 | 38 | 41 | 45 | 52 | 60 | 40 |
| Hardness (JIS) | 63 | 67 | 67 | 69 | 70 | 72 | 66 |
| Resilience (Lupke Rebound) (%) at 70° C. (*4) | 54 | 56 | 57 | 59 | 62 | 63 | 59 |
| Wet skid value (*5) | 80.5 | 80.3 | 81.0 | 80.8 | 80.5 | 80.2 | 77.5 |
| Pico abrasion loss (× 10$^2$ c.c.) | 1.9 | 1.9 | 1.8 | 1.6 | 1.5 | 1.4 | 2.0 |

| Rubber composition and Properties of cured product | Example 6 | Comparative example 3 | Comparative example 4 | Comparative example 5 | Comparative example 6 | Example 7 | Example 8 | Comparative example 7 |
|---|---|---|---|---|---|---|---|---|
| SBR (*1) | 50 | 30 | 30 | 30 | 30 | 85 | 80 | 70 |
| BR (*2) | — | — | — | — | — | 15 | 20 | 30 |
| Natural rubber (RSS No. 1) | 50 | 70 | 70 | 70 | 70 | — | — | — |
| Zinc oxide | 4 | 4 | 4 | 4 | 4 | 4 | 4 | 4 |
| Stearic acid | 2 | 2 | 2 | 2 | 2 | 2 | 2 | 2 |
| Antioxidant | 3 | 3 | 3 | 3 | 3 | 3 | 3 | 3 |
| Carbon black (N339) (*6) | 55 | 55 | 55 | 55 | 55 | 55 | 55 | 55 |
| Aromatic oil | 20 | 20 | 20 | 20 | 20 | 20 | 20 | 20 |
| Vulcanization accelerator (NOBS) (*3) | 1.2 | 1.2 | 1.2 | 1.2 | 1.2 | 1.2 | 1.2 | 1.2 |
| Sulphur | 3.2 | 2.0 | 3.2 | 4.0 | 5.0 | 3.2 | 3.2 | 3.2 |
| Properties of cured products | | | | | | | | |
| 100% modulus (Kg/cm$^2$) | 38 | 27 | 32 | 35 | 35 | 40 | 40 | 39 |
| Hardness (JIS) | 65 | 60 | 63 | 64 | 65 | 68 | 68 | 68 |
| Resilience (Lupke Rebound) (%) at 70° C. (*4) | 60 | 57 | 62 | 64 | 64 | 57 | 58 | 58 |
| Wet skid value (*5) | 75.1 | 72.3 | 72.0 | 72.3 | 73.0 | 76.2 | 75.3 | 72.0 |
| Pico abrasion loss (× 10$^2$ c.c.) | 2.3 | 2.0 | 2.6 | 2.8 | 2.9 | 1.7 | 1.7 | 1.6 |

Note:
(*1) Styrene-butadiene rubber (SBR) produced under the trademark of Nipol 1502 by Nippon Zeon Co., Ltd., Japan.
(*2) Cis 1,4-butadiene rubber produced under the trademark of Nipol 1220 by Nippon Zeon Co., Ltd.
(*3) N-oxydiethylene-2-benzothiazolesulphenamide (NOBS).
(*4) Allowed to stand in an oven at 70° C. for 40 minutes, soon after which withdrawn and measured in the atmosphere at 20° C.
(*5) Test Surface: Safety Walk (Type B, black, produced by 3M Co., Ltd.)
(*6) Designation of the specific carbon black in accordance with ASTM 2516.

EXAMPLES 9-12 AND COMPARATIVE EXAMPLES 8-10

The procedure of Example 1 was followed except that the ingredients as shown in Table 2 were used to obtain rubber compositions. The rubber compositions so obtained were cured in the same manner as in Example 1 and then tested for properties. The results are shown in Table 2.

TABLE 2

| Rubber composition and Properties of cured product | Comparative example 8 | Comparative example 9 | Example 9 | Example 10 | Example 11 | Example 12 | Comparative example 10 |
|---|---|---|---|---|---|---|---|
| SBR (*1) | 100 | 100 | 100 | 100 | 100 | 100 | 100 |
| Zinc oxide | 3 | 3 | 3 | 3 | 3 | 3 | 3 |
| Stearic acid | 1 | 1 | 1 | 1 | 1 | 1 | 1 |
| Antioxidant | 2.5 | 2.5 | 2.5 | 2.5 | 2.5 | 2.5 | 2.5 |
| Carbon black (N351) (*2) | 60 | 60 | 60 | 60 | 60 | 60 | 60 |
| Spindle oil | 20 | 20 | 20 | 20 | 20 | 20 | 20 |
| Vulcanization accelerator (NOBS) | 1.2 | 1.2 | 1.2 | 1.2 | 1.2 | 1.2 | 1.2 |
| Sulphur | 2 | 3 | 3.2 | 4 | 4.5 | 5 | 6 |
| Properties of cured product | | | | | | | |
| 100% modulus (Kg/cm$^2$) | 33 | 42 | 44 | 52 | 56 | 60 | 67 |
| Hardness (JIS) | 64 | 65 | 66 | 67 | 69 | 71 | 73 |
| Resilience (Lupke Rebound) (%) at 70° C. | 59 | 62 | 64 | 65 | 66 | 67 | 67 |
| Wet skid resistance | 79.9 | 79.9 | 79.5 | 78.8 | 80.1 | 77.9 | 78.8 |
| Pico abrasion loss (× 10$^2$ c.c.) | 2.2 | 2.1 | 2.0 | 1.8 | 1.7 | 1.7 | 1.6 |

Note:
(*1) Styrene-butadiene rubber produced under the trademark of Solprene 1204 produced by Asahi Kasei Co., Ltd., Japan.
(*2) Designation of the specific carbon black in accordance with ASTM 2516.

EXAMPLE 13

The procedure of Example 1 was followed except that the following ingredients and the carbon black No. 1 to No. 12 shown in Table 3 were used, thereby to obtain rubber compositions. The rubber compositions so obtained were cured at 160° C. for 20 minutes with the results being indicated in Table 3.

Ingredients:
100 parts of SBR (produced under the trademark of Nipol 1502 produced by Nippon Zeon Co., Ltd.), 3.0 parts of zinc oxide, 2.0 parts of stearic acid, 3.5 parts of antioxidant, 1.2 parts of vulcanization accelerator (NOBS), 5.0 parts of aromatic oil, 3.5 parts of sulphur and 50 parts of carbon black.

The relationship between the resilience and the Pico abrasion loss, which is derived from the results of Table 3, is as shown in FIG. 1. This Figure indicates that the use of carbon black (No. 4, No. 6, No. 7 or No. 11) having a DBP absorption number of at least 119 [c.c./100 g] will provide higher resilience in the resulting rubber products among the carbon blacks which gave the same level of abrasion loss.

TABLE 3

| Type of carbon black | (*1) Iodine adsorption number (gI$_2$Kg) | (*2) DBP absorption number (c.c./100g) | Resilience (%) (at 70° C.) | Wet skid resistance (Safety Walk test surface) | Pico abrasion loss (× 10$^2$ c.c.) |
|---|---|---|---|---|---|
| 1 | 140 | 116 | 50 | 79.3 | 2.3 |
| 2 | 118 | 114 | 52 | 78.8 | 2.4 |
| 3 | 119 | 115 | 50 | 80.0 | 2.2 |
| 4 | 105 | 125 | 56 | 78.9 | 2.5 |
| 5 | 90 | 114 | 54 | 78.9 | 2.5 |
| 6 | 90 | 119 | 56 | 80.2 | 2.3 |
| 7 | 84 | 126 | 57 | 80.2 | 2.4 |
| 8 | 80 | 102 | 57 | 78.9 | 2.8 |
| 9 | 86 | 73 | 60 | 79.1 | 3.1 |
| 10 | 71 | 100 | 61 | 78.7 | 3.2 |
| 11 | 67 | 120 | 59 | 79.4 | 2.5 |
| 12 | 48 | 105 | 63 | 78.5 | 3.5 |

(*1) ASTM D1510
(*2) ASTM D2414 exerted on a tire being tested. The tires were preliminarily run at a speed of 100 Km/hr for 30 minutes and then tested three times for rolling resistance at each of the predetermined travelling speed. The averaged rolling resistance at each of the speeds is indicated in Table 4.

Measurement for wet road braking performance

The aforesaid tires were tested three times at each

TABLE 4

| Example and Comparative example | Amount of sulphur (Parts) | Rolling resistance (Kg) Testing speed | | | | | | Wet road braking performance (distance) (m) Testing speed | |
|---|---|---|---|---|---|---|---|---|---|
| | | (Km/hr) 40 | (Km/hr) 60 | (Km/hr) 80 | (Km/hr) 100 | (Km/hr) 130 | (Km/hr) 150 | (Km/hr) 40 | (Km/hr) 80 |
| Comparative example 11 (tread composition of Comparative example 1 used) | 2.0 | 2.1 | 2.5 | 2.9 | 3.3 | 4.7 | 7.1 | 7.7 | 32.0 |
| Comparative example 12 (tread composition of Comparative example 1 used) | 3.0 | 2.1 | 2.5 | 2.9 | 3.3 | 4.5 | 6.6 | 7.2 | 30.0 |
| Example 14 (tread composition of Example 1 used) | 3.2 | 2.0 | 2.5 | 2.8 | 3.3 | 4.4 | 6.4 | 7.5 | 31.5 |
| Example 15 (tread composition of Example 2 used) | 3.5 | 1.9 | 2.4 | 2.7 | 3.1 | 4.2 | 6.2 | 7.7 | 31.6 |
| Example 16 (tread composition of Example 3 used) | 4.0 | 1.9 | 2.3 | 2.7 | 3.0 | 4.1 | 6.1 | 7.6 | 31.8 |
| Example 17 (tread composition of Example 4 used) | 5.0 | 1.8 | 2.2 | 2.6 | 2.9 | 4.0 | 5.9 | 7.7 | 31.2 |

EXAMPLES 14–17 AND COMPARATIVE EXAMPLES 11–12

Using steel cords at the belt portion of tires to be produced and polyester cords at the carcass portion thereof, radial tires of "165 SR 13" size were prepared. All the tires were prepared with the same specification except the compositions of the treads thereof.

The compositions of the treads were varied using the compositions of Examples 1–4 and Comparative examples 1 and 2. Measurements were carried out for rolling resistance and wet road braking performance on each tire (this performance being expressed in terms of distance (m) over which tires run from the time of being braked to the time of being stopped). The results are indicated in Table 4.

Measurement for rolling resistance

Tires to be tested were inflated at the air pressure of 1.9 Kg/cm$^2$. Measurements were carried out on a 1707 mm diameter indoor wheel with a static load of 420 Kg speed for their braking performance on a wet asphalt-paved road. The averaged values are shown in Table 4.

As mentioned above, the tire tread commpositions of the present invention comprising 100 parts by weight of SBR alone or a SBR-based rubber and 3.2–5.0 parts by weight of sulphur may provide tire treads having solved a problem that a conventional attempt to produce tire treads having low rolling resistance will decrease the resulting tire treads in wet road braking performance and wear resistance, by balancing these three properties. Thus, they may provide tire treads having low rolling resistance without impairing the other two properties.

What is claimed is:

1. A tread composition for tires having low rolling resistance consisting essentially of, by weight, (A) 100 parts of a member selected from the group consisting of styrene-butadiene rubber alone and a mixture containing at least 50% of styrene-butadiene rubber and less than 50% of at least one member selected from the group consisting of natural rubber and synthetic diene rubbers, (B) 3.2–5.0 parts of sulphur and (C) at least 40 parts of carbon black.

2. A tread composition according to claim 1, wherein the carbon black has an iodine adsorption number of number of 60–100 gI$_2$/kg and a DBP adsorption number of at least 119 cc/100 g.

3. A tread composition according to claim 1, wherein said sulphur is in β-crystal form.

4. A method for lowering the rolling resistance of tires comprising providing tires with a tread having a composition formed by admixing (A) 100 parts of a member selected from the group consisting of styrene-butadiene rubber alone and a mixture containing at least 50% of styrene-butadiene rubber and less than 50% of at least one member selected from the group consisting of natural rubber and synthetic diene rubbers, (B) 3.2–5.0 parts of sulphur and (C) at least 40 parts of carbon black having an iodine adsorption number of 60–100 gI$_2$/kg and a DBP adsorption number of at least 119 cc/100 g, said parts being by weight.

5. A method according to claim 4, wherein said sulphur is in β-crystal form.

* * * * *